United States Patent Office 3,190,811
Patented June 22, 1965

3,190,811
METHOD OF PRODUCING A BACTERIOLOGICAL INSECTICIDE

Charles W. Molander, 14816 Bora Drive, La Mirada, Calif.
No Drawing. Filed June 14, 1963, Ser. No. 287,754
2 Claims. (Cl. 195—96)

This is a continuation-in-part of application Serial No. 10,073, filed February 23, 1960, and now abandoned.

This invention relates to a new biological insecticide produced by certain bacteria in the absence of sporulation or spores and which inhibits the development of insect larvae and pupae.

A great need exists for bacteriological insecticides for the control of various insects, particularly in the dairy industry, where the fecal material of animals is a major area for development of flies and other insects. Besides spraying and other conventional methods, it has been proposed to control the development of such insects by feeding animals with food containing a suitable insecticidal substance so that the insecticidal substance will pass through the digestive tract of the animal and will be present in the fecal material of the animals, thereby inhibiting the development of insect larvae or pupae present therein either originally or by deposition by adult insects.

Such an insecticidal substance must retain its insecticidial activity as it passes through the digestive tract of animals and must also be non-toxic to the animals involved. Previous attempts to develop an effective insecticide with the required qualities have been largely unsuccessful so far as the dairy industry is concerned.

Other difficulties in the past consisted in obtaining an effective bacteriological insecticide in a relatively short time of production and in a yield sufficient for commercial use at a relatively low cost. I have been able to produce a suitable bacteriological insecticide in sufficient amount for commercial use after a relatively short time of incubation and in the absence of spores or sporulation of the bacteria involved.

It is, therefore, an object of my invention to provide a bacteriological insecticide which inhibits the growth of insect larvae and pupae, particularly of the family Musciade in the order Diptera.

Another object of my invention is to provide an effective bacteriological insecticide which is produced in a relatively short time of incubation in the absence of bacterial spores or bacterial sporulation and in commercially practicable amounts.

A further object of my invention is to provide a bacteriological insecticide which is non-toxic to animals when fed to them in their food.

A still further object of my invention is to provide a bacteriological insecticide which retains its insecticidal activity after passing through the digestive tract of animals.

These and other objects will be more readily understood by reference to the following discussion and claims.

According to the present invention, the novel biological insecticide is produced by fermentation of a quantity of *Bacillus thuringiensis* var. *thuringiensis* under controlled conditions in the absence of bacterial spores or sporulation. The novel insecticide may also be produced in the same manner by using a quantity of the organism *Bacillus thuringiensis* var. *majumder.*

The organisms *B. thuringiensis* var. *thuringiensis* and *B. thuringiensis* var. *majumder* are commercially available at the present time. They may be maintained on nutrient agar or other suitable media, and transferred about once a month by standard bacteriological procedures.

To accomplish proper fermentation of the organisms to produce the biological insecticide, a suitable nutrient media is used including a nitrogen source and a carbohydrate source diluted in water. Vitamins and other minerals may also be included.

The pH of the nutrient media may vary from 6 to 8, but the optimum pH for maximum production of the biological insecticide is 6.8, which is critical.

The temperature at which the nutrient media is maintained is also critical for optimum yields, and is 30° C. However, it is possible to vary the temperature from 20° C. to 40° C. and still obtain some amounts of insecticidal activity.

These conditions of time, temperature, and nutrient media are maintained for a maximum period of 16 hours. I have found that the biological insecticide is produced in maximum yield in the absence of any spores of sporulation of the bacteria.

Tests were made of the culture media to determine the absence of spores or sporulation after incubation times of 6, 12, and 16 hours. The method used was that of Schaeffer and Fulton using a Malachite Green stain for spores as modified by Ashby in Science 87,433 (1938). The procedure is as follows:

A sample of the culture media (containing both liquid and solid material) is obtained with a loop and placed on a glass slide as a film. The film is dried and fixed on the glass slide with minimal flaming. The slide is placed over a beaker of boiling water, resting it on the rim with the bacterial film uppermost. Within several seconds, large droplets of water condense on the bottom side of the slide and the slide is then flooded with a 5% solution of Malachite Green which is allowed to act for one minute while the water continues to boil. Thereafter, the slide is washed in cold water and then flooded with 0.5% safranine for 30 seconds and then washed, dried and examined microscopically for presence of spores which are stained green under this method.

Under the above method for detection of spores, no spores or sporulation were observed at incubation times of 6, 12, or even at the maximum incubation time of 16 hours of the culture media used to produce the novel biological insecticide.

A typical example illustrating a preferred method of production of my novel insecticidal substance follows.

*Example 1*

A culture media is prepared comprising by weight approximately 3.0% of beet or other type of molasses, 0.6% yeast, 0.3–1.5% corn steep liquor, 0.2% $KH_2PO_4$, and 0.6% animal stick liquor. Other suitable aqueous culture media may also be used so long as a nitrogen source and a carbohydrate source are present. A quantity of *Bacillus thuringiensis* var. *thuringiensis* is then inoculated into this culture media which is then allowed to ferment at 30° C. at a pH of 6.8 under aerobic conditions for a maximum of 16 hours. At the end of 16 hours, samples of the culture media were tested for the presence of spores or sporulation by the method previously described. None was found. The culture media was then tested for insecticidal activity and was found to contain substantial insecticidal activity.

The culture media was then centrifuged for 20 minutes at 4,000 r.p.m. and the supernatant liquid was filtered through a Whatman No. 1 filter paper. The filtrate was tested for insecticidal activity and was found to contain approximately the same amount of activity as the original culture media. Extraction of the filtrate by diethyl ether did not remove the insecticidal activity.

*Example 2*

The same procedure was followed as in Example 1. After 16 hours of incubation, no spores or sporulation was found. The resulting culture media was adjusted to a pH of 4.5 and extracted with diethyl ether. This extraction did not remove the insecticidal activity of the culture media. Then the culture media was adjusted to a pH of 4.5 and centrifuged and filtered as before in Example 1. The filtrate contained approximately the same insecticidal activity as the original culture media. Extraction of the filtrate by diethyl ether failed to remove the insecticidal activity from the filtrate.

No detectable insecticidal activity is lost by drying the resulting culture media for one hour at 70° C. Redissolving the dried material in the original volume of water produced no decrease in insecticidal activity. However, boiling for 10 minutes destroyed about 50% of the insecticidal activity.

The filtrate containing the insecticidal activity may be applied in any conventional manner such as spraying, etc. It may also be fed to animals as part of their food. Experiments in animal feeding show that no toxic effect was produced on the animals by the insecticidal substance. After such feeding, experiments showed that the development of insect larvae and pupae, particularly in the family Muscidae in the order Diptera, present in the fecal material of the animals receiving the insecticidal substance, was inhibited.

Although I have described preferred embodiments of my invention as to methods of preparation and compositions of matter, it is understood that the scope of the invention is not to be limited thereby but numerous variations are possible without departing from the spirit and scope of the invention and claimed hereinafter.

I claim:

1. A process for producing an insecticidal substance exercising an inhibiting action on insect larvae and pupae of the family Muscidae in the order Diptera, comprising, fermenting the organism *Bacillus thuringiensis* var. *thuringiensis* under aerobic conditions in an aqueous nutritive media containing by weight approximately 3.0% beet molasses, 0.6% yeast, 0.3–1.5% corn steep liquor, 0.2% $KH_2PO_4$, and 0.6% animal stick liquor, at a pH of 6.8 at a temperature of 30° centigrade for a period of up to 16 hours to prevent sporulation, centrifuging the resulting culture medium, and filtering the resulting supernatant liquid containing substantial insecticidal activity therein devoid of any spores and devoid of sporulation.

2. The process of claim 1 wherein the organism fermented is *Bacillus thuringiensis* var. *majumder*.

References Cited by the Examiner
UNITED STATES PATENTS 3,071,519   1/63   Bonnefoi _____ 195—96
3,073,749   1/63   Megna _____ 195—96

OTHER REFERENCES

Steinkaus, Further Observations on *Bacillus thuringiensis* and Other Spore Forming Bacteria, Hilgardia, 23:1–23, 1954.

Angus, Association of Toxicity with Protein-Crystalline Inclusions of Bacillus Sotto Ishiwata, Canadian Journal of Microbiology, vol. 2, #2, April 1956, pp. 122–131.

Bergey's Manual of Determinative Bacteriology, 7th ed., 1957, The Williams & Wilkins Co., Waverly Press Inc., Baltimore, Md., pp. 617–619.

A. LOUIS MONACELL, *Primary Examiner.*